United States Patent [19]

Shimizu et al.

[11] Patent Number: 5,398,943
[45] Date of Patent: Mar. 21, 1995

[54] SEAL DEVICE OF THE NON-CONTACT TYPE

[75] Inventors: Tadayuki Shimizu, Nishinomiya; Toshihiko Fuse, Sanda; Eiji Okumachi, Kobe, all of Japan

[73] Assignee: Nippon Pillar Packing Co., Ltd., Osaka, Japan

[21] Appl. No.: 975,430

[22] Filed: Nov. 12, 1992

[51] Int. Cl.[6] ............................................. F16J 15/34
[52] U.S. Cl. ....................................................... 277/96.1
[58] Field of Search ........................ 277/81 R, 96, 96.1

[56] References Cited

U.S. PATENT DOCUMENTS

| 3,744,805 | 7/1973 | Heinrich | 277/96.1 |
| 4,486,026 | 12/1984 | Furamura et al. | 277/133 X |
| 5,066,026 | 11/1991 | Heck et al. | 277/96.1 |

FOREIGN PATENT DOCUMENTS

| 499370 | 8/1992 | European Pat. Off. | 277/96.1 |
| 450559 | 2/1992 | Japan | 277/96.1 |

*Primary Examiner*—William A. Cuchlinski, Jr.
*Assistant Examiner*—John L. Beres
*Attorney, Agent, or Firm*—Jones, Tullar & Cooper

[57] ABSTRACT

A seal device of the non-contact type having seal faces formed by those end faces of a rotating seal ring and a stationary ring which are perpendicular to axes of the two rings, and also having dynamic pressure generating grooves formed in one of the seal faces at a certain interval in the circumferential direction of the seal face each groove having a first spiral groove portion and a second terminal portion being formed continuous from the front end of each of the first spiral groove portions, extending along the circumferential direction of the seal face but across its corresponding first spiral groove portion, and provided with a closed front end. The seal device can be used at high speed and under high pressure and it can correct the tilting of its seal faces, which is caused by pressure and heat added, to prevent them from being contacted with each other. Even when the difference of pressures added to them changes, the seal device can keep them parallel to each other to reduce the amount of liquid leaked to a greater extent.

3 Claims, 5 Drawing Sheets

SEAL DEVICE OF THE NON-CONTACT TYPE

BACKGROUND OF THE INVENTION

1. Field of the Invention

The present invention relates to a seal device of the non-contact type used for rotary air machines such as a turbine, blower and compressor to limit the amount of liquid leaked through those faces which are perpendicular to a rotating axis. More particularly, it relates to a seal device of the non-contact type which is held by a casing, wherein seal faces of the non-contact type are formed by an end face of a seal ring perpendicular to the axis of a rotating shaft and rotatable together with the rotating shaft and an end face of a stationary ring also perpendicular to the axis of the rotating shaft.

2. Prior Art

FIG. 8 shows a typical one of the conventional seal devices of the above noted non-contact type. In the case of this conventional seal device, dynamic pressure generating grooves 82 are formed in a seal face 81a of a rotating seal ring 81, extending at a certain interval along the circumferential direction of the seal face 81a. When the rotating seal ring 81 is rotated, sealed liquid is forceably taken in between the seal faces by the pumping action of the grooves 82 in the seal face 81a, so that a gap is formed between the seal faces, which are opposed to each other, to keep them out of contact.

In the case of this conventional seal device, however, it is difficult to keep the seal faces stably parallel to each other so as to produce excellent sealing capacity when the seal device is operated at high speed and under high pressure in the gas turbine, compressor or others. In other words, when the seal faces are distorted by pressure and heat they partly contact each other, because the gap between them is small. The distribution of pressures exerted on the seal faces is thus made unbalanced and they are therefore increasingly heated and develop distortions. They are thus damaged and are not able to produce any sealing capacity.

In order to solve this problem, Japanese Patent Publication Hei 1-22509 discloses another seal device wherein a rotating seal ring and a stationary ring are designed to have self aligning seal faces. In this seal device, three parameters such as the depth of each of the grooves in the seal face, the ratio at which the width of the seal face relative to the width of the groove in the radial direction of the seal face and the balance ratio are set in such a manner that, when the seal faces are to be distorted, a moment is automatically provided to prevent the seal faces from being distorted and keep them parallel to each other.

In the seal device disclosed in Japanese Patent Publication Hei 1-22509 having self aligning seal faces has its limits, however, because the values of the three parameters have limits. When the machine is not operated, therefore, the seal faces contact each other, but when the machine is operating, dynamic pressure is created to promote the leakage of sealed liquid. This increases the amount of liquid leaked.

SUMMARY OF THE INVENTION

The present invention is therefore intended to eliminate the drawbacks mentioned above.

Accordingly, an object of the present invention is to provide a seal device of the non-contact type capable of being used at high speed and under high pressure, capable of preventing the balance of pressures from being lost when the seal faces are distorted by the pressure of the sealed liquid and by the generated heat, capable of reducing the amount of liquid leaked between the seal faces, and capable of eliminating any fear that the seal faces are damaged.

Another object of the present invention is to provide a seal device of the non-contact type capable of effectively creating averaged dynamic pressure by using the entire seal face.

These objects of the present invention can be achieved by a seal device of the non-contact type comprising a casing, a rotating shaft passing through the casing, a seal ring arranged between the outer circumference of the rotating shaft and the inner circumference of the casing and rotated together with the rotating shaft, a stationary ring arranged between the outer circumference of the rotating shaft and the inner circumference of the casing and held by the casing, and seal faces formed by those end faces of the rotating seal ring and the stationary ring which are opposed to each other and which are perpendicular to axes of the rotating seal ring and the stationary ring, respectively. The dynamic pressure generating grooves are formed in one of the seal faces at a certain interval, each groove having a first spiral shaped portion extending from the outer circumferential rim of the seal face in the radial direction thereof thereby presenting a leading edge with respect to the direction of rotation, the seal device being characterized in that each groove further having a second terminal portion. The second terminal portion having a closed front end.

According to the seal device of the non-contact type of the present invention, high pressure liquid can be taken in by dynamic pressure generating grooves in the seal face to keep the seal faces stably parallel to each other. Even when the machine is operated at high speed and under high pressure, therefore, the seal faces can be made stable. Further, when the seal faces are distorted by pressure and heat, a moment to correct for the distortion can be created by the pumping action of the first spiral shaped portion of the grooves to thereby reliably prevent them from contacting each other. Still further, the amount of liquid leaked because of the difference of pressures exerted on them can be reduced by the pumping action of second terminal portion of the grooves. Still further, dust in the air, oil mist in bearings, and others are not allowed to enter into the grooves because the second terminal portion of the grooves is continuous from the front end of each of the first spiral shaped portion of the grooves and is closed at its front end. The seal faces are therefore not damaged by entry of the dust, oil mist and others. This enables the seal device to produce certain sealing capacity even when it is used for a long time. The reliability of the seal device according to the present invention can be thus enhanced.

According to another aspect of the present invention, the seal device of the non-contact type is characterized in that the ratio at which the width of the seal face in the radial direction thereof relative to the width of the grooves also in the radial direction of the seal face is set in a range of 0.5–0.7. Even when one of the seal faces is inwardly or outwardly distorted or both of them are to be distorted by heat, therefore, the distribution of pressures exerted on them can be kept balanced to reliably prevent them from contacting each other.

According to a further aspect of the present invention, the seal device of the non-contact type is characterized in that the ratio at which the width of the grooves in the radial direction of the seal face relative to the width of the first spiral shaped portion of groove also in the same direction is set in a range of 0.6–0.7. Enough dynamic pressure can be thus created and it can be exerted equally on the whole of each seal face. This reliably prevents the seal faces from contacting each other.

These and other objects of the present invention will become apparent from the following detailed description.

DETAILED DESCRIPTION OF THE PREFERRED EMBODIMENT

Figure 1:
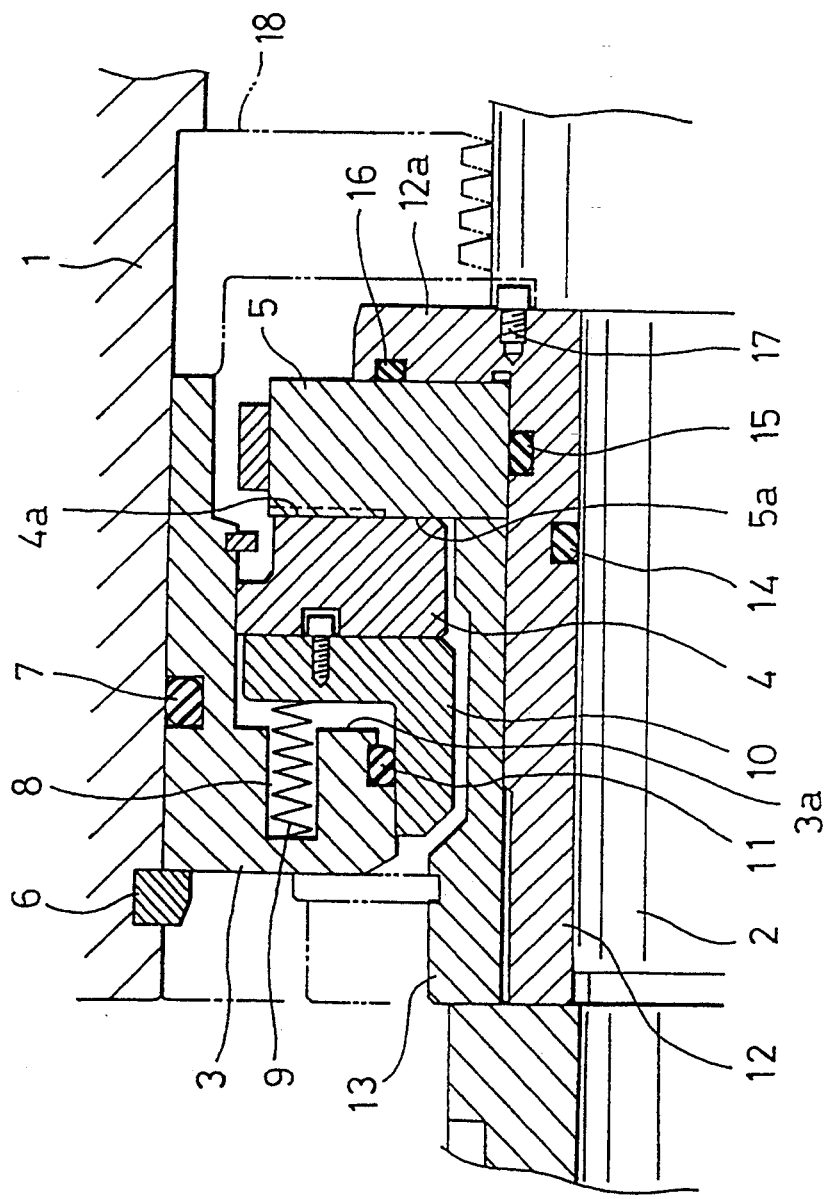
FIG. 1 is an enlarged and vertically-sectioned view showing the main portion of the seal device of the non-contact type according to an embodiment of the present invention.

FIG. 1 is an enlarged and vertically-sectioned view showing a main portion of the seal device of the non-contact type according to an embodiment of the present invention. In FIG. 1, reference numeral 1 represents a casing, 2 a rotating shaft extending through the casing 1, and 3 a ring fixed to the inner wall of the casing 1. Reference numeral 4 denotes a stationary ring supported by the fixed ring 3 and provided with an end face 4a perpendicular to the axis of the rotating shaft 2. Reference numeral 5 denotes a seal ring arranged around the rotating shaft 2 and rotating together with it. The rotating seal ring 5 has an end face 5a opposed to the end face 4a of the stationary ring 4 and perpendicular to the axis of the rotating shaft 2. Both end faces 4a and 5a of the rings 4 and 5 which are opposed to each other serve as sealing faces.

The fixed ring 3 is positioned relative to the casing 1 in the axial direction thereof by a stopper member 6, for example, and an O-ring 7 seated on the outer circumference of the fixed ring 3 seals the casing 1. Plural blind holes 8 are formed on the inner face of that portion 3a of the fixed ring 3 which is perpendicular to the axis of the fixed ring 3. The blind holes are separated from their adjacent ones by a certain interval in the circumferential direction of the fixed ring 3. Each of the blind holes 8 holds a spring member 9 therein, by which the stationary ring 4 is urged in the axial direction of the casing 1 through a disk 10, L-shaped in section and contacted with and fixed to the stationary ring 4. An O-ring 11 is interposed between the fixed ring 3 and the disk 10 to establish sealing between them.

Reference 12 represents a first sleeve fitted onto the rotating shaft 2 and reference numeral 13 denotes a second sleeve fitted onto the first sleeve 12. The rotating seal ring 5 is positioned in the axial direction of the rotating shaft 2 by a flange 12a of the first sleeve 12 and the second sleeve 13. Reference numeral 14 represents an O-ring for preventing liquid, for example, in the casing 1 from leaking between the first sleeve 12 and the rotating shaft 2. Reference numerals 15 and 16 represent O-rings for preventing the liquid in the casing 1 from leaking between the rotating seal ring 5 and the first sleeve 12. Reference numeral 17 denotes a pin for stopping the first sleeve 12 from rotating relative to the rotating shaft 2. Reference numeral 18 denotes an auxiliary labyrinth seal.

Figure 2:
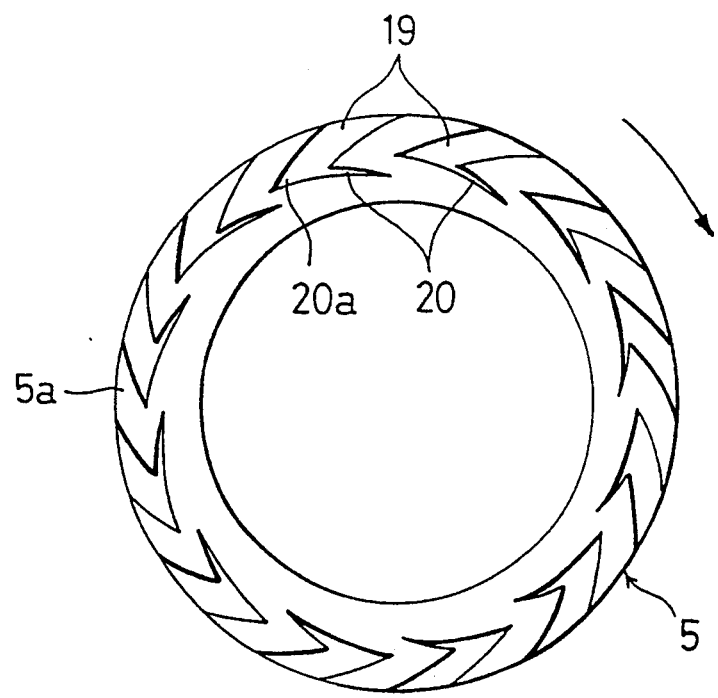
FIG. 2 is a front view showing a seal face of the rotating seal ring.

As shown in FIG. 2, a plurality of dynamic pressure generating grooves are formed in the seal face 5a of the rotating seal ring 5, each including a first spiral shaped portion 19 extending from the outer circumferential rim of the ring 5 to the inner one thereof. It is preferable that each spiral shaped groove portion 19 has a depth, ranging from 2 $\mu$m to 20 $\mu$m, into the seal face 5a of the seal ring 5. A second terminal portion 20 extends continuous from the front end of each spiral shaped groove portion 19 in a direction along the circumferential direction of the ring 5 but across the direction in which each spiral shaped groove portion 19 extends. This second terminal portion 20 becomes narrower as it comes nearer to its front end, and it is finally closed at its front end, as shown in FIG. 2.

When the rotating shaft 2 is rotated in the case of the above-described seal device of the non-contact type, the rotating seal ring 5 is thus rotated as shown in FIG. 2. The spiral shaped groove portion 19, having a leading edge 19a, are formed in the seal face 5a of the rotating seal ring 5, along with second terminal potions 20, having a leading edge 20b. Liquid is forceably introduced between the seal faces 4a and 5a of the rings 4 and 5 thanks to the pumping action of the spiral shaped groove portion 19. As a result, a film of the liquid having a certain sealing pressure is maintained between the seal faces 4a and 5a to allow a desired amount of the liquid to be leaked through the small gap between them.

Even when the pressure of the sealed liquid changes, loads exerted on the stationary ring 4 and the disk 10 can be kept balanced to enable the machine to be stably operated.

Even when the seal faces 4a and 5a are distorted by the pressure of the sealed liquid and by heat caused by the high speed operation of the machine to produce an unbalanced distribution of pressures relative to the faces 4a and 5a, a moment around the center of rotation can be obtained by the pressure, with the largest moment caused at and in the vicinity of each of the closed ends 20a of the second terminal portions 20. The seal faces 4a and 5a can thus be kept parallel to each other. In addition, the amount of liquid leaked can be kept as small as possible by the pumping action of the second terminal portions 20 because this pumping action acts in the direction in which the liquid leaked between the seal faces 4a and 5a is pushed back.

Figure 3:
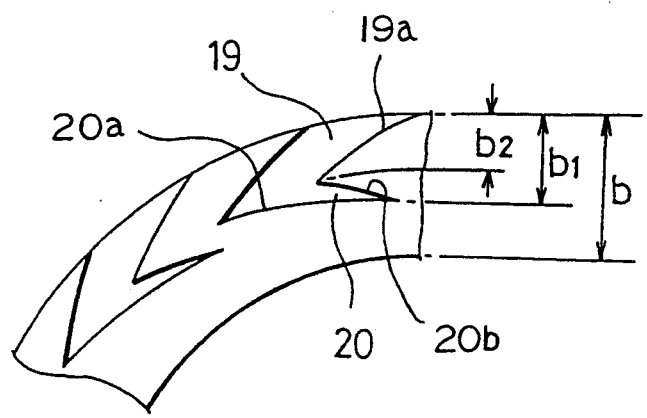
FIG. 3 is a view showing the dimensional relation between the first spiral shaped portion and the second terminal portion of the groove when they are measured in the radial direction of the seal face.
Figure 4:
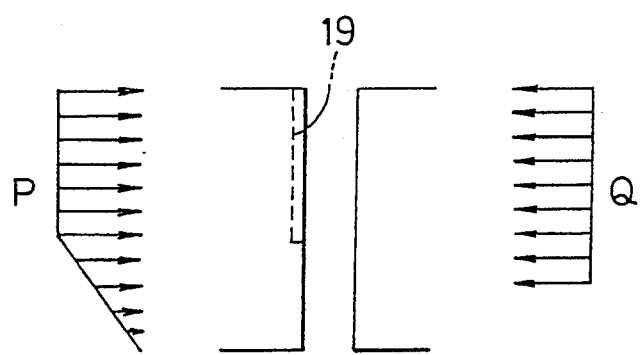
FIG. 4 is a view showing the distribution of pressures exerted on the seal faces when these seal faces are not distorted.

When the seal faces 4a and 5a are not distorted by the pressure and heat, the pressure distribution is as shown in FIG. 4. The distribution depends upon a width $b_1$ of the first spiral shaped groove portion 19 and second terminal portion 20 and upon a width $b_2$ of the first spiral shaped groove portion 19 in the radial direction of the seal face 5a (see FIG. 3).

The width of the seal face 5a in the radial direction thereof is b, that of the first spiral shaped groove portions 19 and second terminal portions 20 is $b_1$, and that of the first spiral shaped groove portion 19 is $b_2$. It is preferable to set $b_1/b$ in a range of 0.5–0.7. The reason is as follows: In a case of $b_1/b < 0.5$, pressure caused by the first spiral shaped groove portions 19 and second terminal portions 20 in the seal face 5a of the rotating seal ring 5 is small and it acts only on narrow areas of the seal faces 4a and 5a along their outer circumferential rims. It is therefore not enough to keep the seal faces 4a and 5a not in contact.

Figure 5:
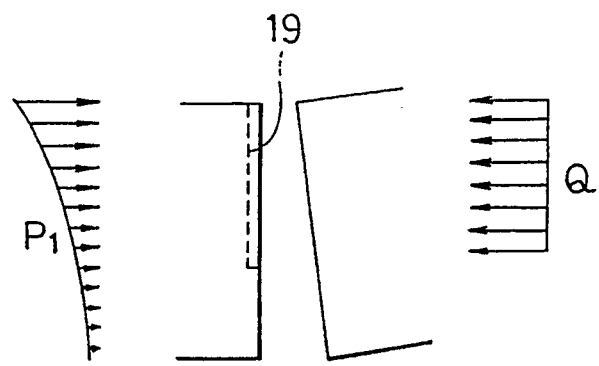
FIG. 5 is a view showing the distribution of pressures seen when one of the seal faces is inwardly distorted.
Figure 6:
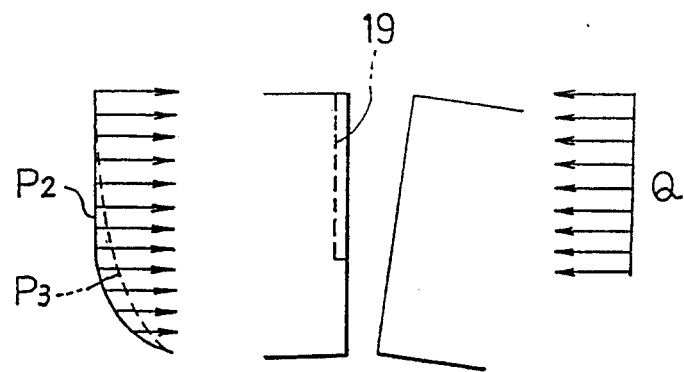
FIG. 6 is a view showing the distribution of pressures seen when one of the seal faces is outwardly distorted.

When the stationary seal ring 4 is inwardly distorted as shown in FIG. 5 in a case of $b_1/b > 0.7$, the distribution of pressures becomes $P_1 < Q$, thereby making the gap between the seal faces 4a and 5a so small as to bring them into contact. When the stationary seal ring 4 is outwardly distorted as shown in FIG. 6, the pressure distribution becomes $P_2 > Q$, thereby making the gap large. $P_2$ is thus made $P_3$ equal to Q.

Figure 7:
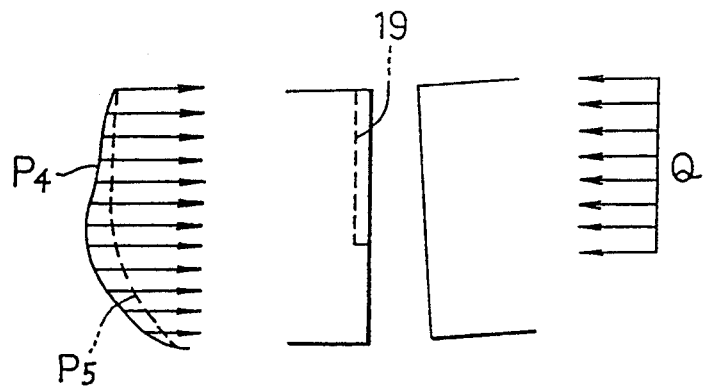
FIG. 7 is a view showing the distribution of pressures seen when the width of the grooves in the radial direction of the seal face is set in a certain range.
Figure 8:
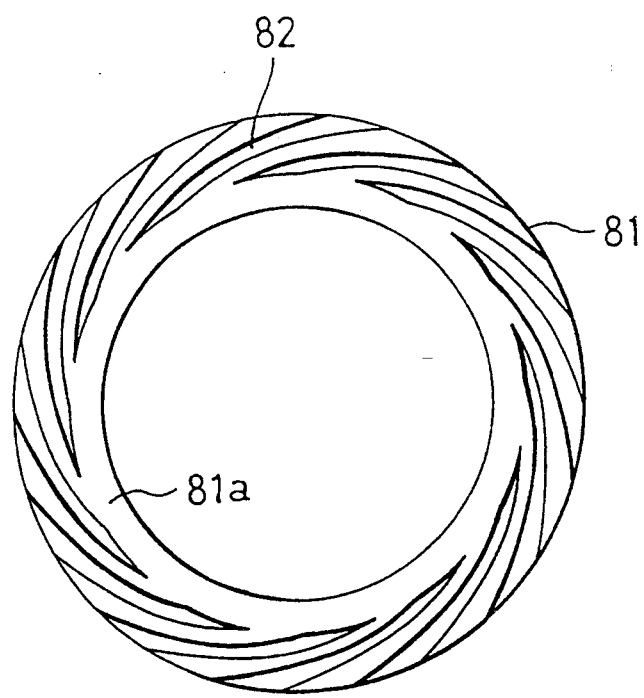
FIG. 8 shows a seal face of the conventional seal device of the non-contact type.

When $b_1/b$ is in the range of 0.5–0.7 as described above, the pressure distribution in the case where the stationary seal ring 4 is distorted inwardly becomes $P_4 > Q$, as shown in FIG. 7, thereby making the gap between the seal faces 4a and 5a large, and the pressure distribution in the case where the stationary seal ring 4 is distorted outwardly becomes $P_5 = Q$. In other words, the pressure distribution exerted on the seal faces 4a and 5a can be kept balanced even when the stationary seal ring 4 is either inwardly or outwardly distorted, thereby more reliably preventing the seal faces 4a and 5a from being contacted.

It is preferable to set $b_2/b_1$ in a range of 0.6–0.7. The reason is as follows: In the case of $b_2/b_1 < 0.6$, the dynamic pressure generating action of the first spiral shaped groove portions 19 is not enough to obtain a large enough pressure so as to keep the seal faces 4a and 5a out of contact. When the stationary seal ring 4 is inwardly distorted as in the case where $b_2/b_1 > 0.7$, the pressure distribution is made unbalanced, thereby causing the gap between the seal faces 4a and 5a to be made so small that they are contacted with each other.

The front end of each second terminal portion 20 is closed. This prevents dust in the air and oil mist in bearings from being introduced between the stationary and rotating seal rings 4 and 5, thereby insuring that the seal faces 4a and 5a are not damaged by the dust and oil mist.

Although the first spiral shaped groove portions 19 and second terminal portions 20 have been formed in the seal face 5a of the rotating seal ring 5 in the above-described case, they may be formed in the stationary seal ring 4.

Further, it is not necessary that each second terminal portion 20 is tapered as described above. It may have any number of other optional shapes, if necessary.

What is claimed is:

1. In a seal device of the non-contact type, comprising: a casing; a rotating shaft extending through the casing; a seal ring arranged between the outer circumference of the rotating shaft and the inner circumference of the casing and rotated together with the rotating shaft; a stationary ring arranged between the outer circumference of the rotating shaft and the inner circumference of the casing and held by the casing; and seal faces formed by those end faces of the rotating seal ring and the stationary ring which are opposed to each other and which are perpendicular to the axes of the rotating seal ring and the stationary ring, respectively, wherein dynamic pressure generating grooves are formed in one of the seal faces at a certain interval, extending from the outer circumferential rim of the seal face in the radial direction thereof, said seal device being characterized in that said grooves each have:

a first spiral shaped portion extending from said outer circumferential rim, thereby presenting a leading edge with respect to the direction of rotation;

a second terminal portion continuous with said first spiral shaped portion and extending from said leading edge in the direction of rotation, said second terminal portion having a closed end so that it does not extend about the entire circumference of the sealing face;

said second terminal portion being tapered in the direction of rotation, becoming narrower as it comes nearer to its closed end;

the ratio of the radial width of the dynamic pressure generating grooves to the radial width of the entire seal face is 0.5–0.7; and the ratio of the radial width of the second terminal portions to the radial width of the entire pressure generating grooves is 0.6–0.7.

2. The seal device of the non-contact type according to claim 1, wherein the dynamic pressure generating grooves are formed in the seal face of the rotating seal ring.

3. The seal device of the non-contact type according to claim 1, wherein the dynamic pressure generating grooves are formed in the seal face of the stationary ring.

* * * * *